Patented Dec. 16, 1924.

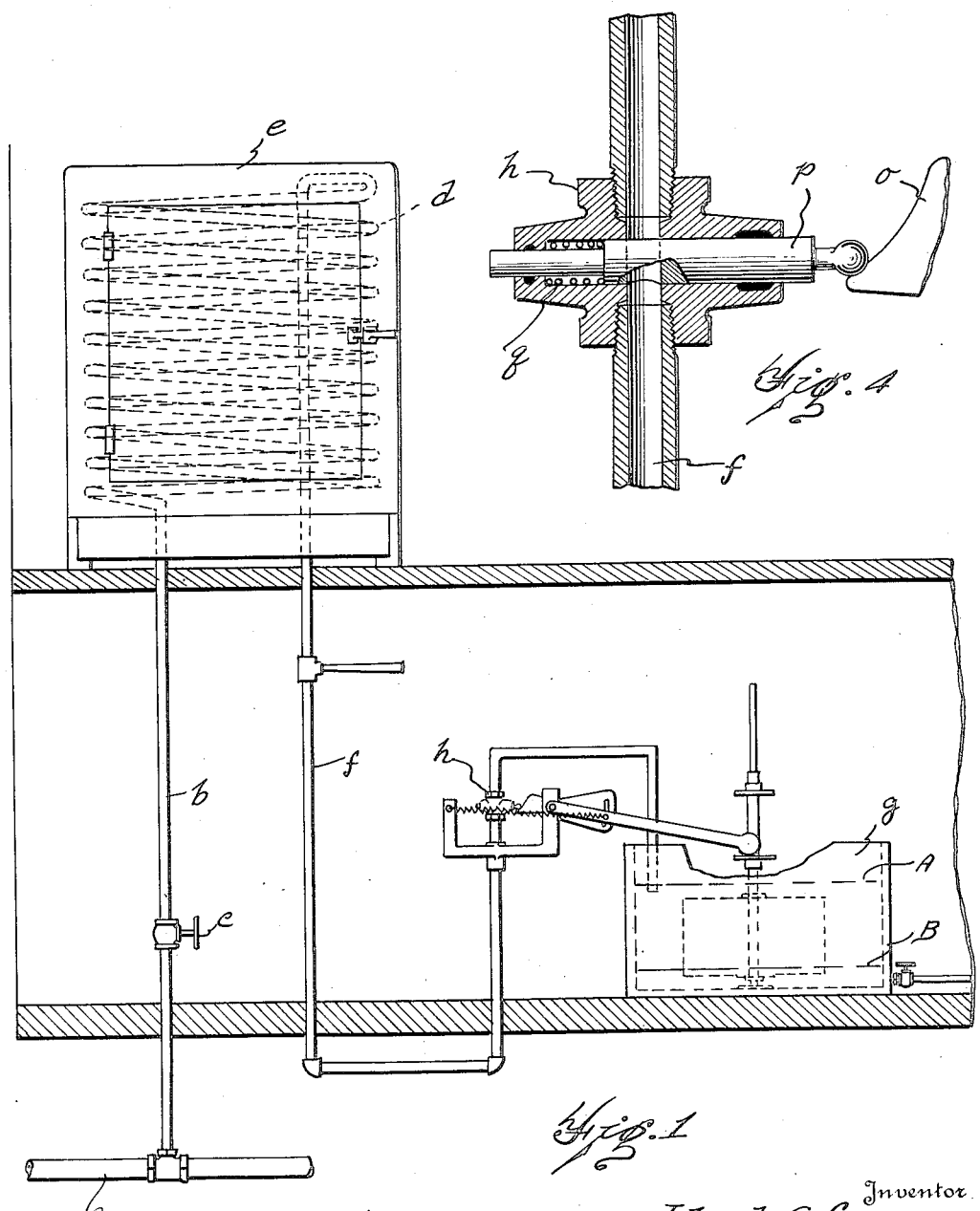

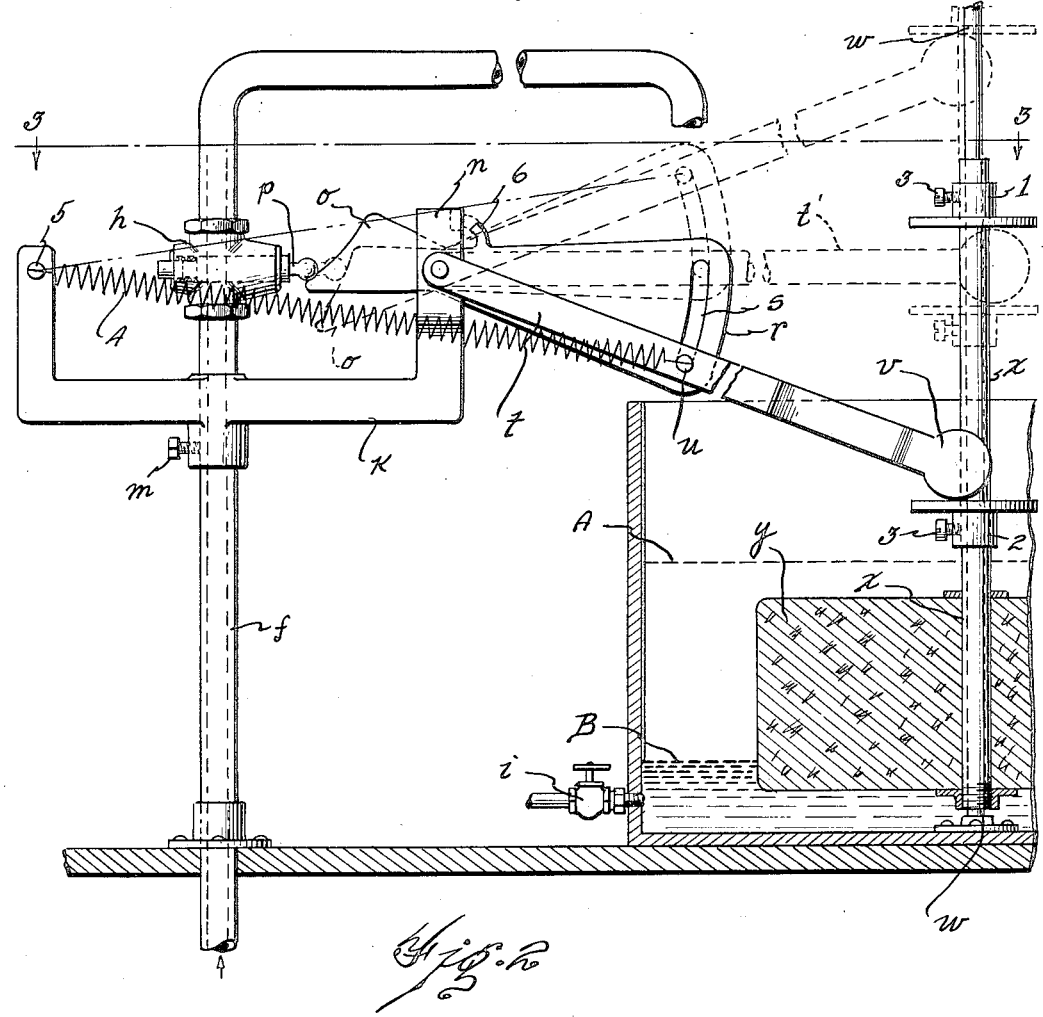
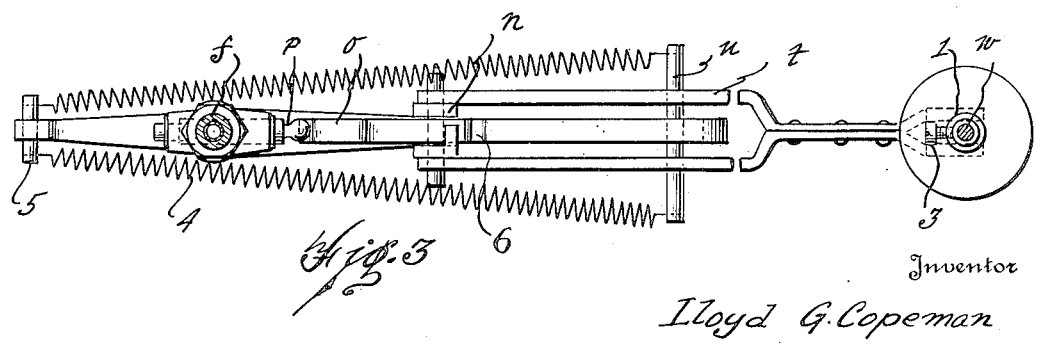

1,519,757

UNITED STATES PATENT OFFICE.

LLOYD G. COPEMAN, OF FLINT, MICHIGAN.

WATER CONTROL FOR REFRIGERATOR SYSTEMS.

Application filed May 22, 1924. Serial No. 715,044.

*To all whom it may concern:*

Be it known that I, LLOYD G. COPEMAN, a citizen of the United States, residing at Flint, in the county of Genesee and State of Michigan, have invented certain new and useful Improvements in Water Controls for Refrigerator Systems, of which the following is a specification.

This invention relates to a water control, one of its many uses being the control of the water flow through a hydrorefrigerating system.

The ordinary means for periodically passing a quantity of cold water through a hydrorefrigerator is not adaptable when a pressure system is used. This water control is especially adapted for use in a pressure system. The refrigerating system is so constructed that any time water is used in the household the same must pass through the refrigerator before flowing from the taps or other outlets.

However, during the night when the service outlets are not being used there would be no flow of cold water through the refrigerator were it not for an independent control means whereby this periodic flow of water through the refrigerator is taken care of.

The construction of my control is such that the water is periodically caused to fill the tank and the water is then allowed to bleed out of the tank at a slow rate until it reaches a predetermined low level, thereby actuating valve mechanism whereby the tank is again filled to a predetermined high level, the valve then being shut off.

I am aware of the fact that there are many valve controls which allow water to fill the tank slowly until a predetermined high level is reached when the mechanism opens the valve and allows the tank to discharge rapidly. However, this construction is not adaptable to a hydrorefrigerating system, as the most efficient cooling is obtained when the water is drawn directly from the well and passes through the refrigerator coils in a large volume for a short period of time. The advantage of this periodic flow of a large volume of cold water through the coils for cooling purposes may be quite evident from the following explanation:

Where the water flows through slowly the pipes are cooled slowly but the air surrounding the pipes is not disturbed and it creates a volume of insulating air of a higher temperature than the water within the coils, thereby preventing the proper cooling of the refrigerator. However, when the water is passed through the refrigerator coils in large quantities at a high velocity the coils are cooled suddenly, thereby disturbing the atoms of air in the vicinity of the coil and promoting a circulation of cooled air through the refrigerator.

To obtain this periodic flushing of the refrigerator it is necessary to provide means whereby the valve controlling the flow of water through the coils is held open for a certain length of time to allow the full volume of water to pass through the refrigerator coils, the same valve being then shut off for a definite length of time. I accomplish this periodic flushing by a new mechanical construction in which I use an auxiliary tank which is filled rapidly when the valve is opened and is discharged slowly while the valve is closed.

In the drawings:

Fig. 1 is a diagrammatic view of a hydrorefrigerator system connected with a water pressure main, with my improved water control installed therein.

Fig. 2 is an elevation of my water control with the auxiliary tank shown in section.

Fig 3 is a plan view thereof taken on the line 3—3 of Fig. 2.

Fig. 4 is a detailed vertical section through the valve.

$a$ designates the water pressure main to which the conduit $b$ is connected, the valve $c$ controlling flow of water therethrough. The conduit $b$ is connected to the coils $d$ in the refrigerator $e$, the water being discharged from the coils in the refrigerator into the conduit $f$ which discharges into the auxiliary tank $g$.

Valve $h$ controls the flow of water through the conduit $f$. Obviously when the valve is open the cold water from the pressure main is caused to pass through the refrigerator and fill the tank. Valve $i$ controls the outlet of the water from the said tank; this valve $i$ may be so regulated as to cause the water to discharge from the tank at a very slow rate. In fact, it is possible to discharge the tank either in about ten minutes or fifteen minutes or several hours, depending upon the adjustment of the valve $i$. My new means of controlling the valve $h$ is clearly shown in Figs. 2 and 3 where the level of the water in the tank controls the opening and closing of said valve. Secured to the conduit $f$ is a bracket $k$, the set screw $m$ enabling one to quickly position this bracket with respect to the valve $h$. The bracket $k$ is provided with a yoke $n$ which pivotally supports the cam $o$. As shown in Fig. 2 the cam $o$ is positioned to press the valve plunger $p$ inwardly against the tension of the spring $q$, this position being the open position of the valve, allowing the water to flow through the conduit $f$ and discharge into the tank $g$. The cam $o$ is provided with a rearward extension $r$, having the segmental slot $s$ therein. Pivoted to the yoke on the same pin which pivotally supports the cam and its extension, is a rock arm $t$ which carries a pin $u$; this pin is slidable in the slot $s$ of the cam extension. The rear end of the arm $t$ is provided with the yoke $v$.

Secured in the tank is a standard $w$ which slidably supports the sleeve $x$. Secured to this sleeve is a float $y$ and the collars 1 and 2 are adjustably secured to the sleeve by means of the set screws 3. The yoke $v$ of the rock arm $t$ is adapted to engage the enlarged flange of these collars so that the rock arm may be actuated as the float rises or lowers in the tank due to the change of the water level therein.

As shown in Fig. 2 the valve $h$ is open and the water level has reached the low point designated B. The water is thus discharged into the tank at a rapid rate and the level of the water rises until it reaches a level designated by the dotted line A. At this point the rock arm $t$ will be raised to the mid position designated $t^1$. The tension spring 4 has one end secured to the pin $u$ and the other end secured to an extension arm of the bracket $k$ as at 5. As the rock arm $t$ is raised it carries with it the spring and as the same passes the center line position ($t^1$) the spring 4 will now function to complete the movement of the rock arm $t$, which carries with it the cam extension $r$, due to the fact that the pin $u$ has reached the extreme upper limit of the slot $s$. This will cause the cam and the extension to move quickly until the stop 6 comes in contact with a portion of the bracket $k$ and assume the position as shown by the upper dotted lines in Fig 2. This will allow the spring pressed valve plunger to move to the right, thereby shutting off the flow of water through the conduit $f$.

The water in the tank is now allowed to discharge through the valve $i$ at a slow rate, the level of water in the tank lowering until it reaches approximately the level B. The lowering of this water will lower the float, causing the collar 1 to engage the end of the rock arm $t$, thereby lowering the same until it passes the center line position or thrown past center, thereby allowing spring 4 to function to again quickly throw the valve cam for reversing its position and forcing the valve plunger $p$ inwardly to open the valve.

What I claim is:

1. In a water control, the combination of a tank, means for circulating water under pressure and discharging into the tank, a valve for controlling the flow of water, and means for regulating the action of the valve by a bleeding action and by devices for translating the slow action of the bleeding into a quick valve action.

2. In a water control, the combination of a tank, means for circulating water under pressure and discharging into the tank, a valve for controlling the flow of water, and means for regulating the action of the valve by changing the level of the water in the tank by a bleeding action and by devices for translating the slow action of the bleeding into a quick valve action.

3. In a water control, the combination of a tank, means for circulating water under pressure and discharging into the tank, a valve for controlling the flow of water from said tank, a float controlled by the change of water level in the tank, and connections between the float and valve for translating the slow action of the bleeding into a quick valve action.

4. In a water control, the combination of a tank, means for circulating water under pressure and discharging into the tank, a valve for controlling the flow of water, a valve cam for actuating the valve, means for bleeding the tank, a float controlled by the change of water level in the tank, and connections between the float and valve cam for translating the slow action of the bleeding into a quick action of the valve cam for quickly opening or closing the valve.

5. In a water control, the combination of a tank, means for circulating water under pressure and discharging into the tank, a valve controlling the flow of water, a pivoted valve cam for actuating the valve, means for bleeding the tank, a float controlled by the change of water level in the tank, and connections between the float and pivoted valve cam for translating the slow action of the bleeding into a quick rocking action of the valve cam for quickly opening or closing the valve.

6. In a water control, the combination of a tank, means for circulating water under pressure and discharging into the tank, a valve for controlling the flow of water a pivoted valve cam actuating the valve, means for bleeding the tank, a float controlled by the change of water level in the tank, a pivoted rock arm for providing a connection between the float and the valve cam, and means for translating the slow movement of the float and rock arm resulting from such bleeding action into a quick action of the valve cam for quickly opening or closing the valve.

7. In a water control, the combination of a tank, means for circulating water under pressure and discharging into the tank, a valve for controlling the flow of water, a pivoted valve cam for actuating the valve, means for bleeding the tank, a float controlled by the change of water level in the tank, a pivoted rock arm for providing a connection between the float and valve cam, and spring means for translating the slow movement of the float and rock arm resulting from such bleeding action into a quick rocking action of the valve cam for quickly opening or closing the valve.

8. In a water control, the combination of a tank, means for circulating water and discharging into the tank, a valve for controlling the flow of water, a pivoted valve cam for actuating the valve, means for bleeding the tank, a float controlled by the change of water level in the tank, a pivoted rock arm for providing a connection between the float and valve cam, and a spring attached to said rock arm, whereby the initial movement of the rock arm and float stresses the spring until the rock arm is moved past center, the spring then actuating the rock arm and valve cam to translate the slow action of the bleeding into a quick rocking action of the valve cam for quickly opening or closing the valve.

In testimony whereof I have affixed my signature.

LLOYD G. COPEMAN.